April 23, 1935.  D. J. CAMPBELL  1,998,708
INTERNAL COMBUSTION ENGINE
Filed Jan. 15, 1934  3 Sheets-Sheet 1

INVENTOR
Donald J. Campbell
BY
Liverance & Van Antwerp
ATTORNEY

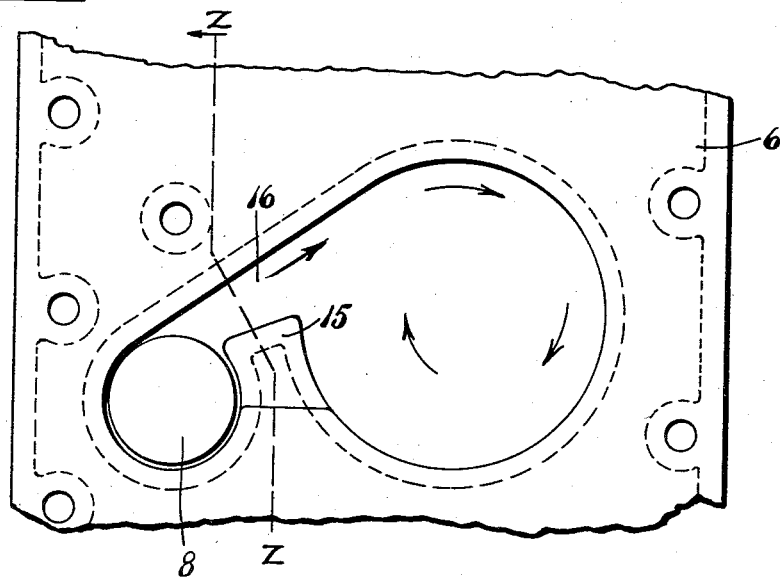
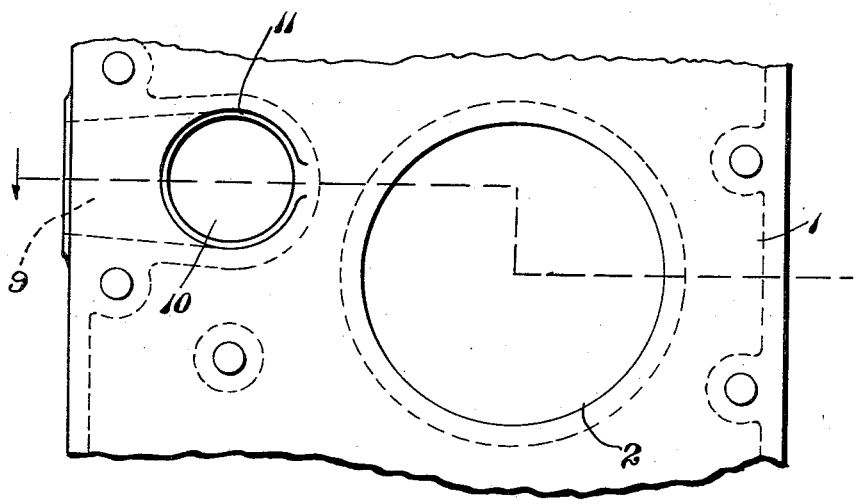

April 23, 1935.                    D. J. CAMPBELL                    1,998,708
                            INTERNAL COMBUSTION ENGINE
                       Filed Jan. 15, 1934          3 Sheets-Sheet 3
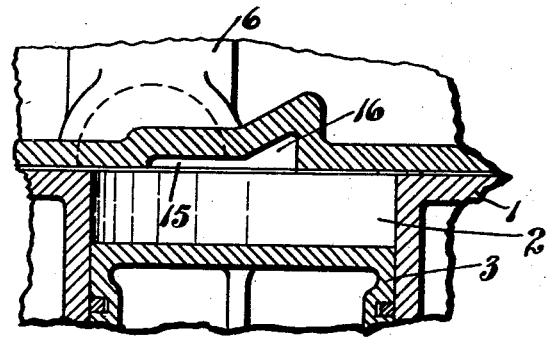
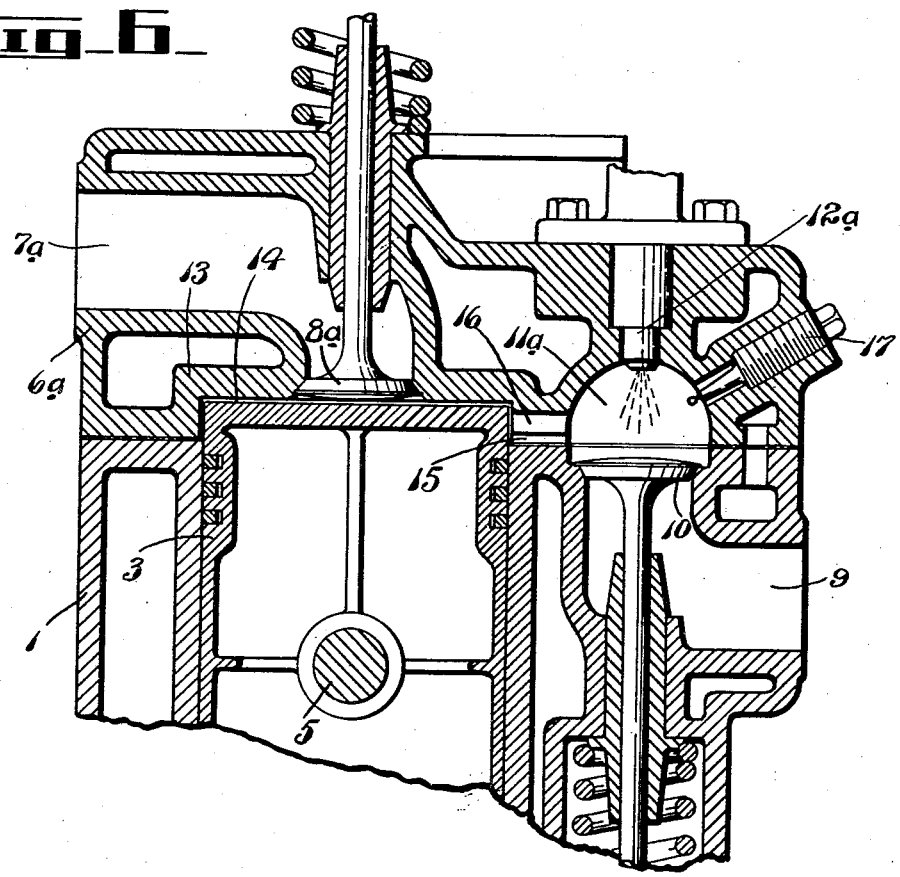
INVENTOR
Donald J. Campbell
BY
ATTORNEY Patented Apr. 23, 1935

1,998,708

UNITED STATES PATENT OFFICE 1,998,708

INTERNAL COMBUSTION ENGINE

Donald J. Campbell, Spring Lake Township, Ottawa County, Mich., assignor to Campbell, Wyant & Cannon Foundry Company, Muskegon Heights, Mich., a corporation of Michigan Application January 15, 1934, Serial No. 706,711

1 Claim. (Cl. 123—191)

This invention relates to internal combustion engines, and more particularly to engines of very high compression and/or Deisel types.

It is an object of the present invention to provide, in an internal combustion engine, means whereby the explosive fuel charge admitted to the cylinder is compressed to a very high degree with a high rise of temperature which may be sufficient to ignite the charge without causing preignition and resultant detonation knocks in the engine. A further object of the invention is to provide an engine of this character wherein, in a Deisel type of engine, air is drawn into the cylinder and very highly compressed and its temperature raised, the air also being compressed in a secondary ignition chamber into which fuel is injected and caused to first ignite. Thereafter the fuel and air is carried into the cylinder on the working stroke of the piston with a continued burning or exploding of the fuel charge, whereby the pressure of the burning fuel and the products of combustion formed thereby causes the piston to move in its working stroke; and such effect of the products of combustion upon the piston occurs after the crank shaft has passed beyond dead center whereby no detonation or other knocks are produced.

These objects and others not at this time specifically stated will appear as understanding of the invention is had from the following description, taken in connection with the accompanying drawings, in which, Fig. 1 is a sectional view of a portion of a cylinder block and the cylinder cover or head therefor, showing also piston, valves and the fuel injector and the manner in which the fuel is injected.

Fig. 3 is a fragmentary under plan view of a part of the cylinder head or cover directly at the end of each cylinder.

Fig. 4 is a fragmentary plan view of the cylinder block showing the same at one of the cylinders therein.

Fig. 5 is a fragmentary section substantially on the plane of line z—z of Fig. 3 looking in the direction of the arrow, and Fig. 6 is a view similar to Fig. 1, illustrating a slightly different embodiment of the invention.

Like reference characters refer to like parts in the different figures of the drawings.

Figure 1:
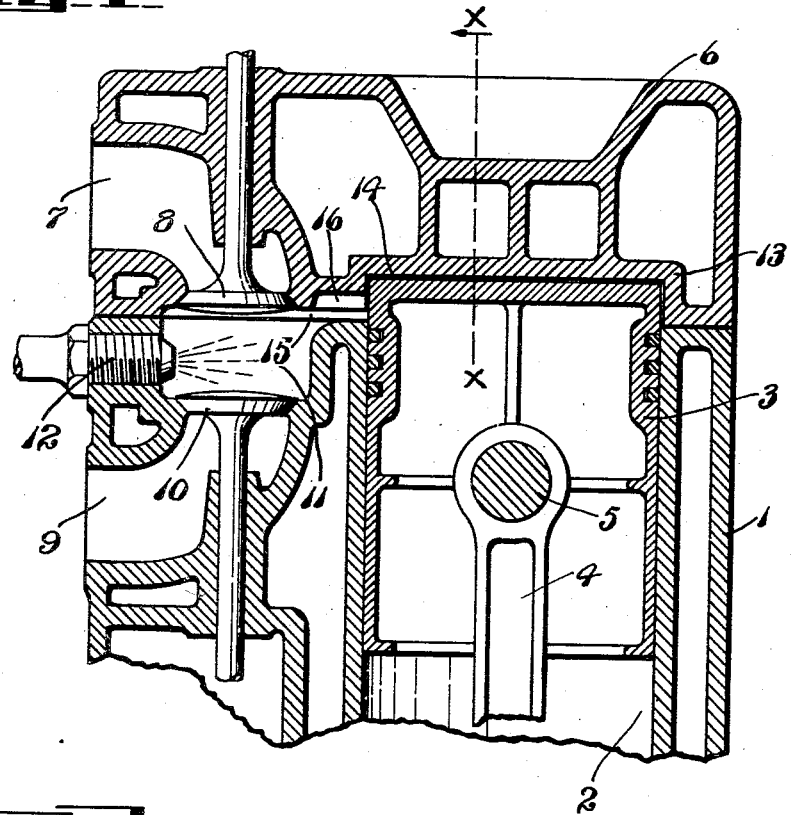

The cylinder block 1 may have a plurality of cylinders 2 therein, one only being shown for purposes of illustration. In each of the cylinders a piston 3 is mounted for reciprocation through the usual connecting rod 4 and piston pin 5, it being understood that the connecting rod 4 at its opposite end is connected with the usual crank shaft.

The head of the cylinder block is covered by a cylinder head or cover 6. For each cylinder there is an air inlet port 7, the inner end of which is closed at times by a valve 8. Likewise in the cylinder block, for each of the cylinders 2, there is an exhaust outlet or port 9, the inner end of which is closed at times by an exhaust valve 10. Between the valves 8 and 10 and housed by portions of the cylinder block and cover a chamber 11 is defined, into which, at one side, a fuel injection nozzle 12 projects, as shown.

Figure 2:
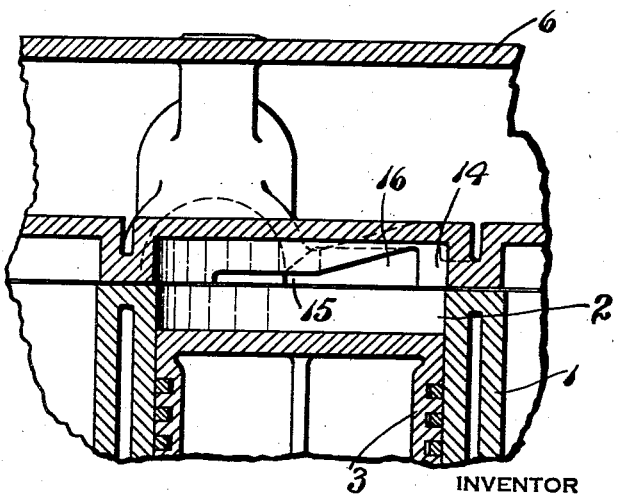
Fig. 2 is a fragmentary section substantially on the plane of line x—x of Fig. 1, looking in the direction of the arrow.

The head or cover 6 at the end of each cylinder 2 is provided with a short cylindrical portion 13 defining a cylindrical recess 14 in axial alinement with the cylinder 2 with which it is associated. The diameter of the recess 14 is slightly larger than the diameter of the cylinder 2 or of the piston 3. An end of the piston is adapted to extend into the cylindrical recess 14 when at one extreme position of its movement. When in such position, as shown in Fig. 2, there is a clearance of small dimensions (approximately .025 to .050 inches) between the sides of the cylinder and the complementary sides of the recess 14; and a substantially similar space or clearance between the end of the piston 3 and the bottom of the cylindrical recess 14.

A passage or port connects the chamber 11 with its cylinder 2. This passage in cross section includes a narrow flat horizontal part 15 and an upwardly tapered enlarged part 16, shown both in Figs. 2 and 5. The passage comprising the parts 15 and 16 is preferably formed by making a suitable depression cast in the underside of the head 6. It will be noted that the outer edge of the passage 16 is located tangentially to both the wall of the cylinder 2 and of the chamber 11 whereby a fuel charge, or products of combustion, passing from the chamber to the cylinder are carried into the cylinder in the direction indicated by the arrows and swirl violently and cause great turbulence thereby intimately and homogeneously mixing all parts of the fuel charge and air together.

In Fig. 6 a slightly different embodiment of the invention is shown. The cylinder block 1 has pistons 3 therein, one for each cylinder, air inlet port 9 and valve 10 therefor. The head 6a has an air entrance port 7a and valve 8a therefor. The fuel injection chamber 11a and injector 12a are at one side of each cylinder and have the inlet connecting ports with parts 15 and 16 the same as previously described. Into the injection chamber 11a an ignition element 17 may extend as shown. The head 6a, at the end of each cylinder, has the same cylindrical recess 14 but in this case the air inlet valve 8a is directly at the center of such recess, the air entering the cylinder and not the chamber 11a.

In operation, during a suction stroke of the piston, air is admitted past the valve 8 entering the chamber 11 and into the cylinder 2. On the next succeeding compression stroke the air is very highly compressed in chamber 11 and also into the recess 14. The pressure in the two is substantially equalized by reason of the clearance between the sides of the piston and the adjacent sides of the recess 14. Fuel is injected into the chamber 11 at the usual time and may be ignited by the high temperature produced upon compression in the chamber 11; or by the ignition element 17.

As soon as the piston 3 starts on its succeeding working stroke and starts to uncover the part 16 there will be a rush of the burning fuel into the cylinder which ignites parts of the charge previously trapped between the end of the cylinder and the bottom of the recess 14. With succeeding further movement of the piston on its working stroke there will be a greater rush of the burning fuel into the cylinder which come into the same tangentially as described thoroughly, completely and intimately and homogeneously mixing the fuel and air together so as to attain the highest degree of combustion. This operation pertains to the constructions shown both in Fig. 1 and in Fig. 6.

Of course, the same operation occurs where the engine is operated not as a Diesel type but merely as a high compression type engine with an auxiliary means for ignition, such as a spark plug or the like. In such case the fuel mixture of air and gas is drawn in during the suction stroke of the piston, compressed on the succeeding compression stroke, ignited and then performs work in expanding and pushing the piston on its working stroke. The ignition takes place in the chamber 11 or 11a and the secondary ignition within the cylinder and at the end of the piston takes place after the piston has started on its working stroke and has moved sufficient to first uncover the portion 16, succeeded by the portion 15, of the connecting port between each cylinder 2 and its associated chamber 11 or 11a. It is apparent that the crank shaft will have moved to a position such that there can be no pressure of exploded gases exerted on the end of the piston before or immediately at the dead center position of the crank shaft, but that it must occur shortly after movement past such dead center position. This avoids preignition knocks or detonation of a similar character and permits the use of very high compressions previously unavailable in internal combustion engines.

The invention is defined in the appended claims and is to be considered comprehensive of all forms of structure coming within their scope.

I claim:

In an internal combustion engine, a cylinder block having a cylinder therein, a piston reciprocating in the cylinder, a cover for the block and cylinder, said cover and block enclosing a primary combustion chamber located to a side of the cylinder, a secondary combustion chamber at the inner side of the cover in axial alinement with the cylinder and located at the end thereof, there being communicating passage between said combustion chambers having a side thereof in tangential relation to the walls of the combustion chambers, said passage being located so as to be closed by the piston at one extreme position of its movement, and opened after the piston has moved a predetermined distance from said extreme position, the cross sectional shape of the communicating passage comprising a flat horizontal part and an upwardly tapered enlarged part for the purpose described.

DONALD J. CAMPBELL.